United States Patent
Bender et al.

(10) Patent No.: US 10,783,385 B2
(45) Date of Patent: Sep. 22, 2020

(54) AUTOMATED CROWD SOURCED TRACKING OF SIGNAGE CONDITIONS BY VEHICULAR IMAGING

(71) Applicant: International Business Machines Corporation, Armonk, NY (US)

(72) Inventors: Michael Bender, Rye Brook, NY (US); Albert Avetisian, Bayside, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 120 days.

(21) Appl. No.: 15/987,761

(22) Filed: May 23, 2018

(65) Prior Publication Data
US 2019/0362165 A1 Nov. 28, 2019

(51) Int. Cl.
G06K 9/00 (2006.01)
G06K 9/46 (2006.01)
G06F 16/50 (2019.01)
G06T 7/00 (2017.01)

(52) U.S. Cl.
CPC ......... G06K 9/00818 (2013.01); G06F 16/50 (2019.01); G06K 9/46 (2013.01); G06T 7/0002 (2013.01)

(58) Field of Classification Search
CPC ...... G06K 9/00818; G06K 9/46; G06F 16/50; G06T 7/001; G06T 7/0008
See application file for complete search history.

(56) References Cited

U.S. PATENT DOCUMENTS

| 9,460,355 | B2 | 10/2016 | Stenneth et al. |
| 2011/0199235 | A1 | 8/2011 | John |
| 2014/0372904 | A1* | 12/2014 | Liu .................... G01C 21/3415 715/753 |
| 2015/0269722 | A1* | 9/2015 | Naithani ............ G06K 9/00798 382/104 |
| 2016/0236689 | A1* | 8/2016 | Pettersson ............. B60W 40/06 |
| 2017/0010117 | A1* | 1/2017 | Oh ...................... G01C 21/3492 |
| 2017/0138466 | A1 | 5/2017 | Jerger |

OTHER PUBLICATIONS

Weiser, M.; "The Computer for the 21st Century"; https://www.ics.uci.edu-/corps/phasell/weiser/Computer21stCentury-SciAM.pdf. 1999.
Anonymously; "Method and System for Determining Validity of a Parking Spot with a Confusing Signage for Parking a Vehicle"; http://ip.com/IPCOM/000240981D; Mar. 16, 2015.
(Continued)

*Primary Examiner* — Casey L Kretzer
(74) *Attorney, Agent, or Firm* — Garg Law Firm, PLLC; Rakesh Garg; Brian Restauro (57) ABSTRACT

Tracking of signage conditions by vehicular imaging includes receiving image data including at least one image of signage captured at a predetermined location. An expected appearance of the signage is received. The expected appearance is based upon a plurality of images captured at the predetermined location. The at least one image is compared to an expected appearance of the signage to identify an anomaly in the signage. A notification is sent to a subscriber based upon the identified anomaly in the signage.

20 Claims, 6 Drawing Sheets

(56) References Cited

OTHER PUBLICATIONS

Anonymously; "System for mapping best locations of speed limit signa to maximize global fuel efficiency"; http://ip.com/IPCOM/000250113D; Jun. 1, 2017.

Anonymously; "Predictive Crowd Sourced Event Profiles for Public Safety"; http://ip.com/IPCOM/000239775D; Dec. 1, 2014.

Anonymously; "Methods to Improve Traffic Safety"; http://ip.com/IPCOM/000229336D; Jul. 22, 2013.

* cited by examiner

AUTOMATED CROWD SOURCED TRACKING OF SIGNAGE CONDITIONS BY VEHICULAR IMAGING

TECHNICAL FIELD

The present invention relates generally to a method, system, and computer program product for tracking of signage conditions. More particularly, the present invention relates to a method, system, and computer program product for automated crowd sourced tracking of signage conditions by vehicular imaging.

BACKGROUND

Governments, authorities, municipalities or other entities install a variety of street signs, lights, indicators and other signage with the aim to keep drivers safe and well-informed of their surroundings. Signage includes any kind of visual indication or graphics created to display information to a particular audience such as drivers of vehicles. Examples of signage includes, but are not limited to, stop signs, traffic signals, street signs, speed limit signs, warning signs, guidance signs, direction signs, and railroad crossing signs. Drivers today are relying on multiple systems (partial autonomy, GPS systems, crowd-sourced directions) to guide them through roads most efficiently. Most signs are obligatory rules or regulations that must be followed regardless of driver or route and must be maintained and followed. Other signage is placed at a location for informational purposes. It is important to entities that install such signage that the signage remain visible to drivers.

SUMMARY

The illustrative embodiments provide a method, system, and computer program product. An embodiment of a computer-implemented method for tracking of signage conditions by vehicular imaging includes receiving image data including at least one image of signage captured at a predetermined location. The embodiment further includes receiving an expected appearance of the signage. In the embodiment, the expected appearance is based upon a plurality of images captured at the predetermined location. The embodiment further includes comparing the at least one image to an expected appearance of the signage to identify an anomaly in the signage. The embodiment still further includes sending a notification to a subscriber based upon the identified anomaly in the signage.

In another embodiment, the expected appearance is based upon a plurality of images of the signage captured by different sources at the predetermined location. An embodiment further includes flagging the signage as anomalous.

Another embodiment still further includes determining that a number of flags of the signage has reached a threshold value, wherein the sending of the notification is responsive to the number of flags reaching the threshold. Another embodiment further includes determining that the signage is a compromised sign based upon a number of flags of the signage reaching a threshold value, and updating a database of signage with the compromised sign.

Another embodiment further includes determining that a vehicle is within an area of the compromised sign, and sending a warning to the vehicle indicating that a compromised sign has been detected in the area. In another embodiment, the warning further instructs a driver of the vehicle to take an action. Another embodiment further includes determining that a vehicle is within an area of the compromised sign, and sending an instruction to the vehicle instructing a vehicle control system of the vehicle to take an action.

Another embodiment further includes receiving at least one condition of the predetermined location at a time of capture of the at least one image. In another embodiment, the identifying of the anomaly in the signage is based upon the at least one condition.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments described herein generally relate to automated crowd sourced tracking of signage conditions by vehicular imaging. The illustrative embodiments recognize that presently available tools or solutions for tracking of signage conditions do not address these needs or provide solutions for these needs.

One or more embodiments provide for alleviating these and other problems by leveraging the large number of cameras that are now available on vehicles to capture images of signs and identify when signs change or are missing, or in the case of electronic signs, stop working. Particular embodiments further provide for assisting drivers when a particular sign is determined as missing or damaged to such a degree that recognition of the sign is hindered.

An embodiment includes a system having a database to receive image and other data feeds from various entities (e.g. GPS providers, automobiles) via vehicles with image recording capabilities. As the vehicles are used, cameras or other imaging devices embedded on the vehicles record snapshots of encounters with road signs, traffic lights, symbols and other signage that are placed and maintained by the local authorities, governments, advertisers are other entities. As a result, the system maintains a crowd-sourced, validated with visual proof, and up-to-date record of the signs that are encountered by drivers.

In an embodiment, the system is used to communicate back with GPS devices in the event that the driver is detected to be in an area where there should have been a road sign/street light or other anomaly in an expected signage and informed to take appropriate actions. In an embodiment, the system flags this event as a 'missed encounter,' and notifies the proper authorities/parties of the anomaly. Further investigation such as inspecting the recorded snapshots by the entity will reveal whether the sign is damaged or misplaced, and adequate action that can be immediately taken to rectify the situation. Various embodiments provide for complete, automated, and real-time monitoring of road signs by collecting data from existing vehicles or systems.

In other embodiments, radio-frequency identification (RFID) tags or other tags are placed on signage and vehicles are equipped with RFID tag readers to track missing or new signs without the need for capturing images.

Although various embodiments are described with respect to tracking the condition of street signs and other signage, it should be understood that in other embodiments other items may be tracked by images captured via vehicles. For example, in a particular embodiment vehicles are equipped with side cameras to track missing or damaged items on the sides of streets such as park benches and garbage cans.

In an embodiment, users register for tracking of signage that is desired to be tracked and the particular actions to take if the signage is missing/damaged and the information is stored in a database. In addition, new signs can be registered and stored in the database as they are installed. In the embodiment, vehicles with built-in cameras or other imaging devices capture images of expected locations of signs based upon GPS tracking information. IN particular embodiments, a mobile phone may be used to captures images and/or location information either in addition to or instead of the vehicle. In the embodiment, the images are sent to the system and the images are compared to previous images stored in the database. If the number of images indicating an anomaly in a particular sign exceeds a threshold for quality, a problem with the quality of the sign is reported. If a number of images show a missing sign, the system reports the missing sign as a problem. In particular embodiments, the system may determine that the sign is still in place if a single image is received showing that the sign is still there.

In one or more embodiments, the system receives conditions at the expected location of the sign, such as time and weather conditions, that may impact the ability to read signs at the location at the particular point in time. In other embodiments, the system sends information to registered GPS/car service providers to allow the providers to notify their subscription base of anomalies in signs. In another particular embodiment, the system sends information to a registered repair entity (e.g. a local DPW) to repair/replace a damaged or missing sign. In another embodiment, the system sends information to registered business regarding signs (e.g. store signs, billboards) that need repairing. In still another embodiment, the system sends information to registered vehicles when the vehicles are approaching a place where a new or missing sign exists. In particular embodiments, self-driving vehicles (SDVs) can be programmed how to handle different signs (e.g., a street name vs a stop sign) in a different manner such as continuing or stopping.

In one or more embodiments, a registration stage allows users to register to supply data including data sent from vehicle camera(s) and/or supplemented by a user's mobile phone. In an embodiment, the user further identifies a feedback path (e.g. integrated in a mobile application or map) for how the user wishes to be notified of an anomaly in a sign. In one or more embodiments, a database is loaded with raw data such as from maps with driving directions as well as samples of size/shape/color of signs to identify type of signs (e.g. stop sign/yield shape color, informational signs). In an embodiment, a commercial entity registers signs to track by providing an image, location and feedback contact. Similarly, in particular embodiments municipalities may register contacts to be information of sign repair/replacement conditions.

In one or more embodiments, an image capturing stage provides for receiving captured images from vehicles when the location of the vehicle is at an expected location (e.g., determined from GPS information) and camera(s) are directed in the appropriate direction of an expected sign. In an embodiment, the system determines a best quality image of the sign location and identifies a sign in the image. In the embodiment, the system compares the image of the sign to baseline images to identify the type of sign (such as by registration or shape). In one or more embodiment, the system also captures conditions at the location of the images such as weather conditions and time of day.

In an embodiment, the system identifies when signage quality is compromised or a sign is missing based on the analysis. In particular embodiments, missing signs can also be validated by a car passenger at the location. In one or more embodiments, images in the location of the sign are received from multiple vehicles to provide crowd-sourced tracking of anomalies in signage to determine whether particular signage is damaged or missing. In a particular embodiment, a configured threshold is set such that if a sufficient number of "missing sign" images are received from one or more vehicles, the system triggers an action indicating that the sign is missing. In a particular embodiment, an image showing a support stand but not a sign triggers an action that the sign is missing.

In one or more embodiments, images indicating a "new" sign are also sent to the system for determining whether a new sign has been installed in a particular location. In one or more embodiments, problems and/or additions are sent to subscribers (e.g., a user can be notified of a new stop sign or a missing sign) if the problems/additions can relate to safety.

In one or more embodiments, subscribers are notified via a visual and/or an audio announcement to proceed with caution in an area when a sign anomaly is detected. In particular embodiments, self-driving vehicles are alerted of a missing sign and instructed to take an appropriate action to reduce the danger such as stopping or slowing down.

One or more embodiments include a system and method of using a computer system to identify changes to signage on a street or other location and recommending or taking an action in response to detecting an anomaly in the signage. In an embodiment, the system includes one or more cameras configured to capture images of signs and sending them to a processing location, a system comparing images for the same location from different vehicles to identify changes in the signage, and a system configured to recommend actions to a subscriber based on the change. In an embodiment, one or more registered mobile cameras send images to the system with the date, time, weather conditions GPS location, and orientation of the camera towards the location being captured. In an embodiment, images from different sources are compared at the same location to determine changes to the signage. In one or more embodiments, the differences are used to categorize problem signage as missing, not visible, or of compromised quality. In particular embodiments, the system determines whether the anomaly is specific to a specific condition of the location of the signage at the time of capture of the image such as a specific time or specific weather conditions.

An embodiment further includes sending instructions to a self-driving vehicle to alert the self-driving vehicle of the problem with the signage and to change actions due to the signage problem. Another embodiment further includes sending warnings to a driver of a manual system to alert the driver of a new, missing, or a damaged sign. An embodiment allows a driver to tag a new signage change as known after the being alerted by the system. In an embodiment, only new signs that are registered are identified such as a new stop sign as opposed to an advertisement for an election.

In a particular embodiment, an entity, such as a DPW, is authorized to update the database of registered signs when the entity installs or upgrades a sign.

An embodiment further includes alerting a repair crew to clean, fix or replace a sign with an urgency factor depending on the type of sign and frequency of occurrence of a problem (e.g. the problem only occurs in sun glare). Another embodiment includes alerting services with subscribed users of signage problems. Another embodiment includes alerting private sector sign owners of problems with signs registered by the owners.

In an example municipal use case, assume that a street light is malfunctioning. A driver approaches intersection including the street light in a vehicle equipped with a camera. The street lights show red, yellow and green lights all lit at the same time. A camera installed on the vehicle takes a snapshot of the street light as it drives by and sends the snapshot to the system. The system receives the snapshot, analyses the snapshot by comparing the snapshot to other street light occurrences to detect an anomaly, and identifies the snapshot as malfunctioning. The system flags the intersection for inspection.

In another example municipal use case, assume that a stop sign is downed a storm. As a driver approaches the intersection, the driver sees no stop sign. The system determines that the drivers location should have a stop sign based upon reporting the missing sign at the intersection by previous vehicles, and sends a notification of the missing sign to the driver's vehicle. The vehicle's GPS navigation system receives the notification that a stop sign was expected and notifies the driver that the driver should take caution or stop. In a particular example in which the vehicle is autonomous or semi-autonomous, the vehicle is triggered to stop.

In another example use case, assume that a sign is blocked or damaged. As a driver of a vehicle approaches intersection including the sign, a vehicle camera takes a snapshot of the sign expected to be there as the vehicle drives by the location of the expected sign and sends the snapshot to the system. The system receives the snapshot and analyses the snapshot by comparing the snapshot to other similar signs to detect an anomaly in the sign. In addition, vehicles of other drivers also send images of the blocked or damaged sign to the system. If the number of images indicating the block or damaged sign are received by the system exceed a predetermined threshold, the systems flags the intersection for inspection.

In an example private-sector use case, assume that a billboard advertisement is defaced or in need of repair. A vehicle encounters a known billboard location, a camera on the vehicle takes a snapshot of the billboard as the vehicle drives by the location, and the vehicle sends the snapshot to the system. The system receives the snapshot, analyses the snapshot compared to an expected outcome based upon the original installation of the billboard, and notifies the property owner of the discrepancy.

In another example use case, assume that a sign is starting to fade. In good lighting the sign is easily read, but difficult to read at night or with sun glare. Vehicle cameras capture images of the sign in different quality conditions throughout the day and send the images to the system. The system analyzes the images to identify times during the day in which reading the sign is difficult and the owner of the sign to repair the problem but at lower severity than a sign that is missing or damaging to an extent to be unreadable.

In another example use case, assume that an informational sign (e.g. a cross street sign) is missing. A vehicle captures an image at the expected location of the informational sign and sends the image to the system. The system identifies the informational signal as missing and determines by the shape of the expected sign that the missing sign is of a lower priority since it does not impact safety of drivers. The system then notifies a responsible party such as a department of public works (DPW) that the sign needs repair.

In another example use case, assume that an informational sign, such as a stop sign, is missing from a cross street at an intersection. When a vehicle approaches the intersection on a street from a direction that is perpendicular to the cross street with the missing sign, the system notifies a driver of the vehicle that a sign is missing from the cross street direction and informs the driver to take precaution when approaching the intersection. The driver may then take precautions such as watching for the approach of another vehicle from the cross street direction that may not stop.

One or more embodiments provide for a crowd-sourced methodology to collect, identify, and verify traffic signs of all types. In various embodiments, drivers can simply continue driving as they need and can opt-in to receive updates regarding signage conditions along a driving route. In one or more embodiments, image data including an image of signage is analyzed and actionable insights is sent back to the driver or the vehicle so that proper safety precautions can be taken if necessary. Various embodiments provide for the ability to identify obstructed, damaged, or missing signs, and promptly notify an entity such as a proper authority that action needs to be taken to accelerate a process by which a governments or other responsible entity can repair and/or replace signs and other signage.

The illustrative embodiments are described with respect to certain types of image data, signage, devices, vehicles, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
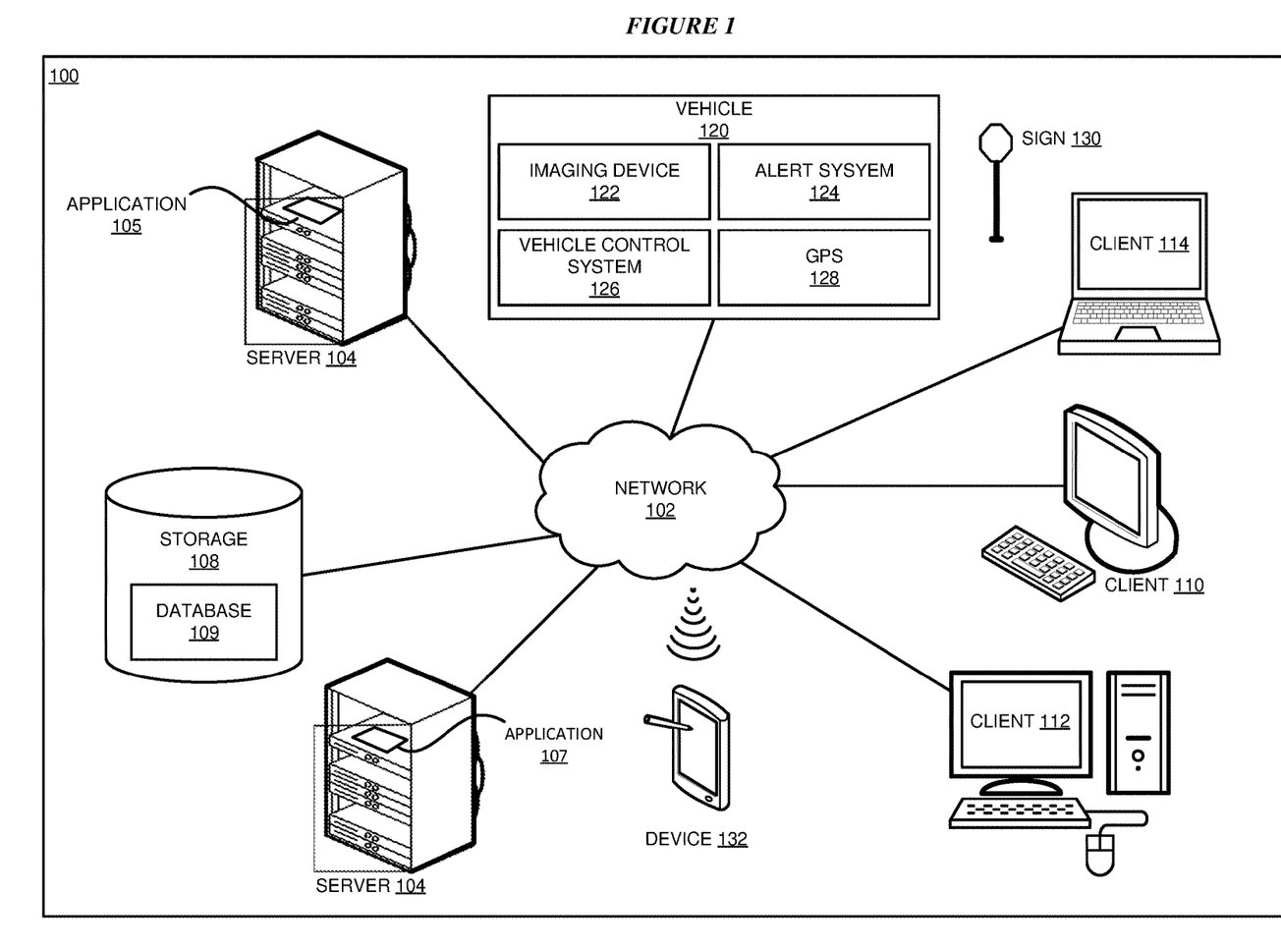
FIG. 1 depicts a block diagram of a network of data processing systems in which illustrative embodiments may be implemented.
Figure 2:
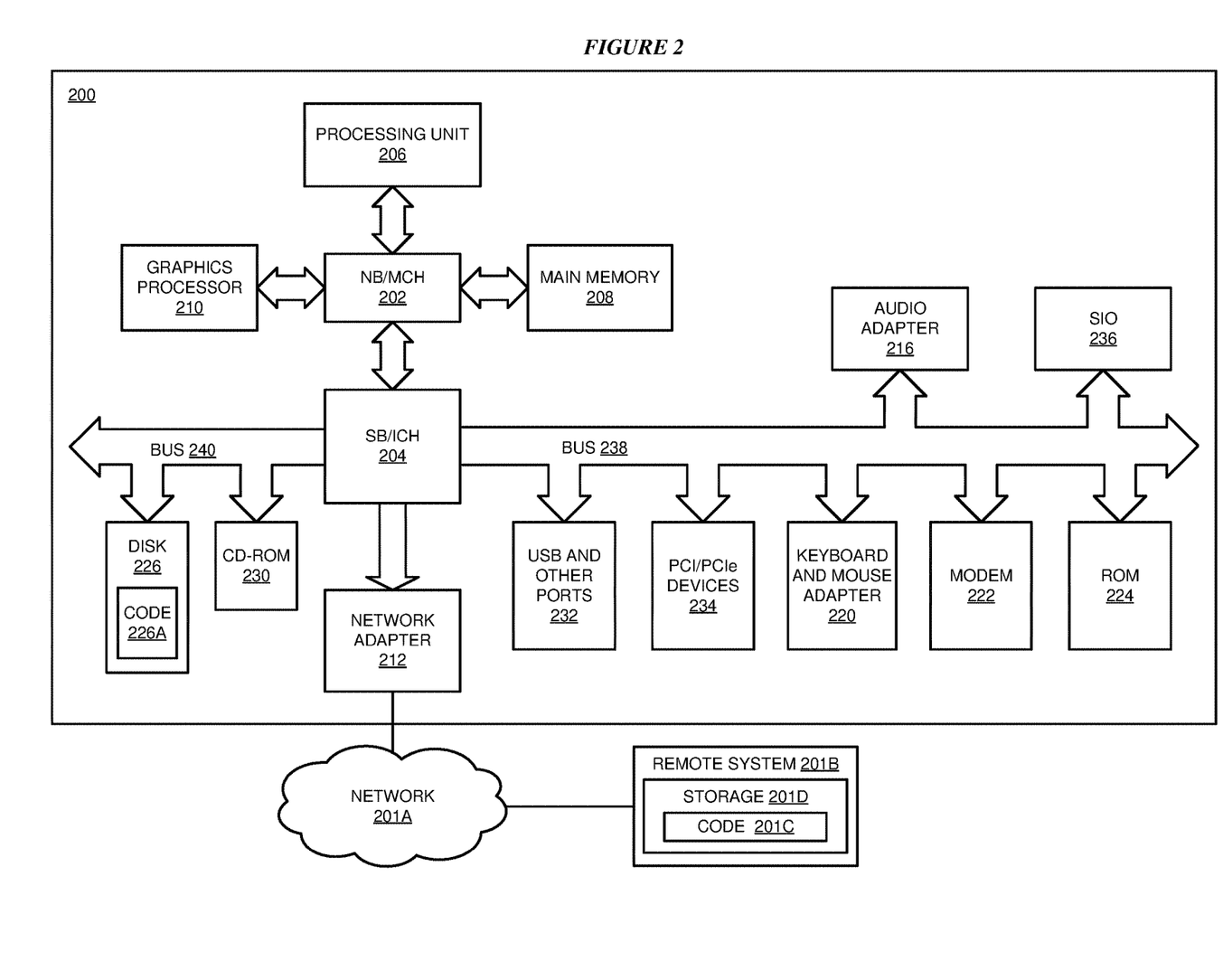
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. In one or more embodiments, storage unit 108 may be configured to store captured images of signage, signage location conditions, baseline signage image data, and subscriber information within a database 109. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a PDA, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 of server 104 implements an embodiment of a process for automated crowd sourced tracking of signage conditions by vehicular imaging as described herein. Application 107 of server 106 implements a subscriber system for receiving notifications of signage conditions such as indications of signage anomalies as described herein with respect to various embodiments.

A vehicle 120 may include an automobile or any other suitable vehicle. Vehicle 120 includes an imaging device 122 an alert system 124, a vehicle control system 126 and a GPS unit 128. Imaging device 122 is configured to capture image data representative of one or more signs for which a condition of the one or more signs is desired to be tracked by a subscriber. Imaging device 122 may include a camera, a radar, a lidar, or any other suitable imaging device. In other embodiments, imaging device 122 may be omitted and the image data may be obtained from another suitable source such as a driver's smartphone. Alert system 124 is configured to deliver alerts to a driver of vehicle 120 indicating that an anomaly has been detected in signage in an area of vehicle 120 such as a damaged or missing sign and/or an action that the driver should take to mitigate the effects of the anomaly. Vehicle control system 126 is configured to control one or more functions of vehicle 120, such as steering, acceleration, or braking, to mitigate the effects of the anomaly. GPS unit 128 is configured provide an indication of a location of vehicle 120 as well as provide a map and/or driving instructions to the driver of vehicle 120.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein in which computer usable program code or instructions implementing the processes of the illustrative embodiments may be located. Data processing system 200 is described as a computer only as an example, without being limited thereto. Implementations in the form of other devices may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as cognitive application 105 and document authoring application 107 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
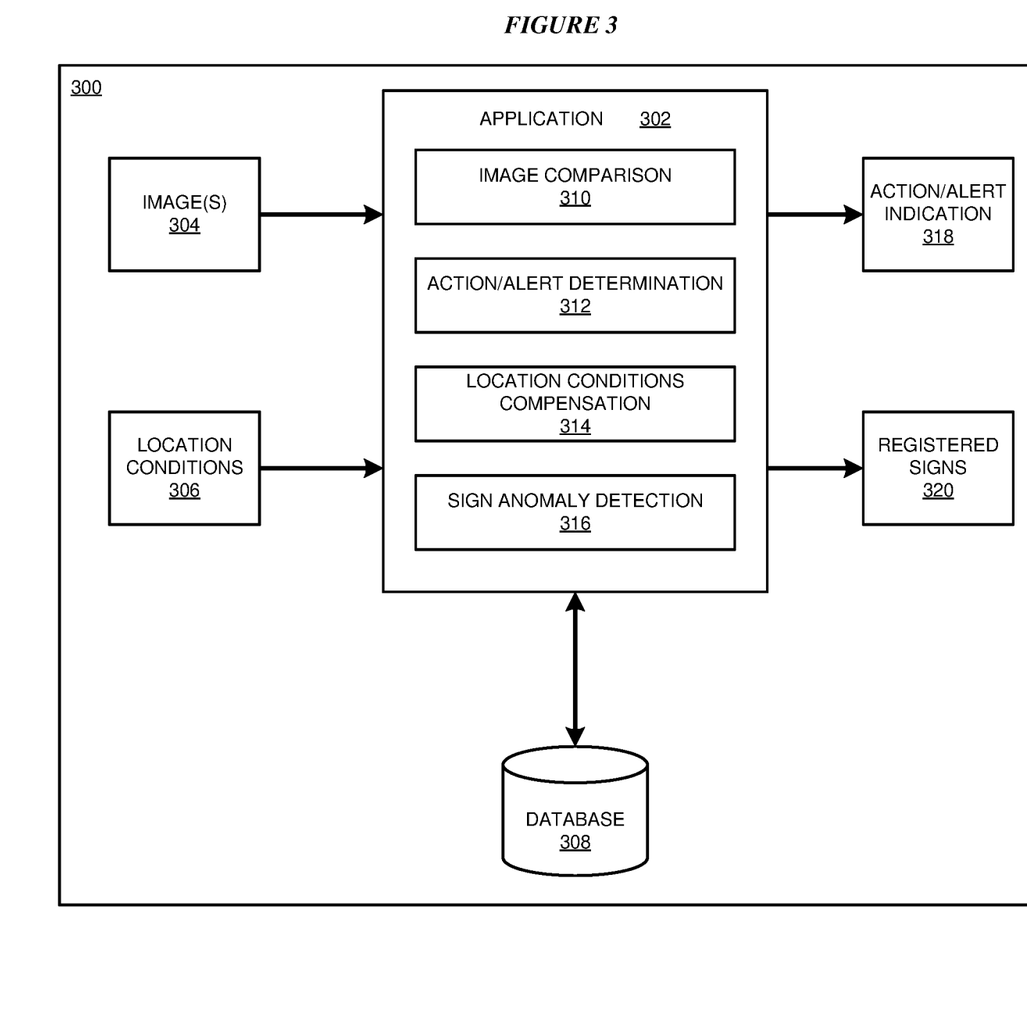
FIG. 3 depicts a block diagram of an example configuration of an application for automated crowd sourced tracking of signage conditions by vehicular imaging in accordance with an illustrative embodiment.

With reference to FIG. 3, this figure depicts a block diagram of an example configuration of an application 302 for automated crowd sourced tracking of signage conditions by vehicular imaging in accordance with an illustrative embodiment. Application 302 is an example of application 105 in FIG. 1. Application 302 is configured to receive one or more images 304 of signage captured by one or more vehicles within a predetermined area, and location conditions 306 of the predetermined area. Application 302 is further configured to communicate with a database 308. Database 308 is an example of database 109 of FIG. 1.

Application 302 includes an image comparison component 310, an action/alert determination component 312, a location conditions compensation component 314, and a sign-anomaly detection component 316. Image comparison component 310 is configured to compare images 304 to baseline images and/or captured images from other vehicles obtained from database 308 to determine differences between one or more between images 304 and the baseline images/other captured images. Action/alert determination component 312 is configured to generate instructions for an action or an alert 318 for sending to a vehicle and/or subscriber in response to a detection of an anomaly in signage as described herein.

Location conditions compensation component 314 is configured to compensate for location conditions that exist at the time of capture of a particular image of signage that may have an effect on identifying a particular sign and determining whether an anomaly exists in the sign, such as time of day and weather, as described herein. Sign anomaly detection component 316 is configured to determine whether a particular sign has an anomaly based upon images(s) 304 and location conditions as described herein. Application 302 is further configured to output a listed of registered signs 320 including a list of signs and a location for the sign for which a subscriber wishes to be information of the condition of the sign. In one or more embodiments, the list of registered signs 320 includes an indication of whether a sign has been determined as including an anomaly.

Figure 4:
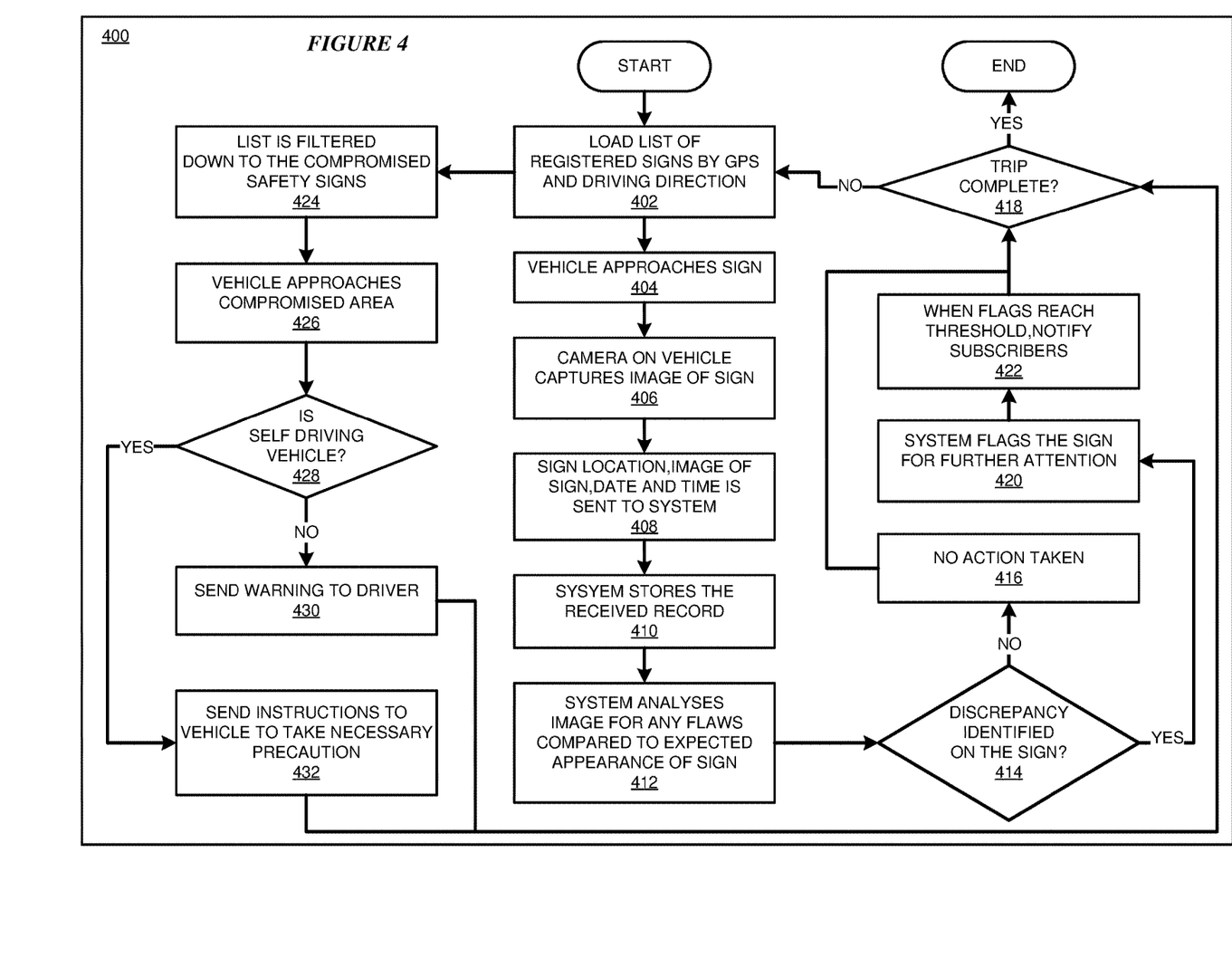
FIG. 4 depicts a flowchart of an example process for automated crowd sourced tracking of signage conditions by vehicular imaging in accordance with an illustrative embodiment.

With reference to FIG. 4, this figure depicts a flowchart of an example process 400 for automated crowd sourced tracking of signage conditions by vehicular imaging in accordance with an illustrative embodiment. In block 402, a system including server 104 loads a list of registered signs by GPS location and driving direction of one or more vehicles. Process 400 includes a first procedure to detect anomalies in signage and a second procedure to warn or send instructions to a vehicle that is approaching an area with compromised signage. In particular embodiments, portions of the first procedure and the second procedure may execute substantially simultaneously. In block 404 during the first procedure, vehicle 120 approaches a registered sign by entering a predetermined area proximate to the sign. In block 406, a camera on vehicle 120 captures on one or more images of the sign. In block 408, vehicle 120 sends an indication of the location, the image of the sign, and a date and time of the capture to server 104. In block 410, server 104 stores the image, location information, date and time in a record within database 109.

In block 412, server 104 analyses the image(s) for any flaws compared to an expected appearance of the sign. In block 414, server 104 determines if a discrepancy is identified on the sign. If no discrepancy is found on the sign, no action is taken in block 416 and process 400 continues to 418. If a discrepancy is found on the sign, in block 420 server 104 flags the sign for further attention. In block 422, when the number of flags for a sign reaches a predetermined threshold, server 104 notifies subscribers that a discrepancy or anomaly has been identified with respect to the sign. In block 418, the system determines whether the trip is complete. If the trip is not complete, the process returns to 402. If the trip is complete, process 400 ends.

After block 402, in block 424 during the second procedure, server 104 filters the list of registered signs down to a list of compromised safety signs that have been indicated as having an anomaly. In block 426, vehicle 120 approaches a compromised area including a sign indicated as having an anomaly. In block 428, server 104 determines whether vehicle 120 is a self-driving vehicle (SDV). If vehicle 120 is not an SDV, in block 430 server 104 sends a warning to the driver of vehicle 120 indicating that a compromised sign has been detected in the area and instructing the driver to take action to mitigate the effects of the compromised sign. If vehicle 120 is an SDV, in block 432 server 104 sends instructions to vehicle 120 instructing vehicle 120 to take necessary precaution to mitigate effects of the compromised sign, such as changing a route, stopping, or changing speed. After block 430 or 432, process 400 continues to block 418 in which server 104 determines whether the trip is complete. If the trip is not complete, the process returns to 402. If the trip is complete, process 400 ends.

Figure 5:
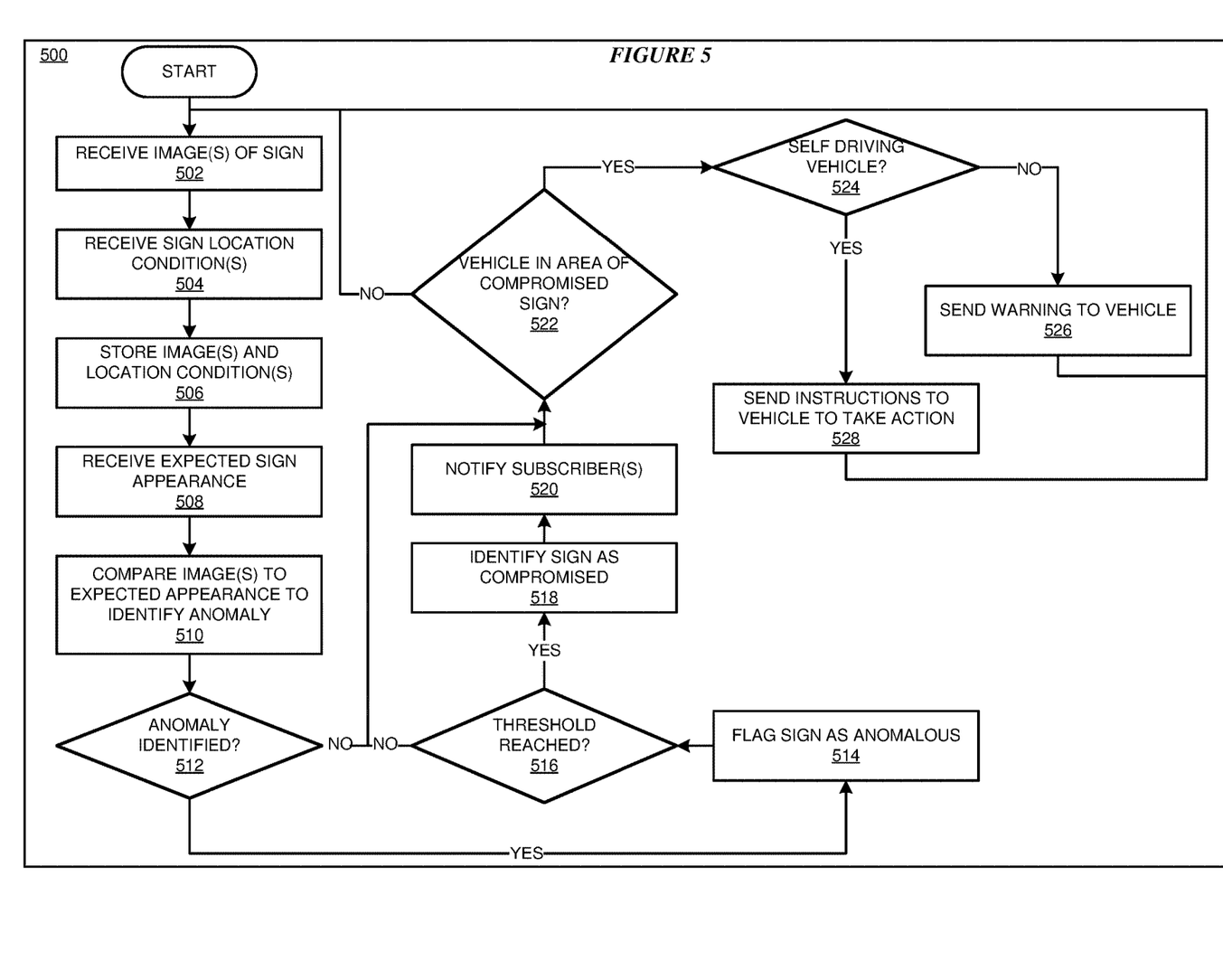
FIG. 5 depicts a flowchart of another example process for automated crowd sourced tracking of signage conditions by vehicular imaging in accordance with an illustrative embodiment.

With reference to FIG. 5, this figure depicts a flowchart of another example process 500 for automated crowd sourced tracking of signage conditions by vehicular imaging in accordance with an illustrative embodiment. In block 502, application 105 receives one or more images of a sign captured by vehicle 120. In block 504, application 105 receives one or more sign location conditions indicative of one or more conditions at the location of the captured image. In particular embodiments, the location conditions may include one or more of time, weather, and lighting conditions.

In block 506, application 105 stores the images and location conditions within database 109. In block 508, application 105 receives an expected sign appearance corresponding to the sign from database 109. In a particular embodiment, the expected sign appearance corresponding to the sign is based upon a baseline image corresponding to a type of the sign. In another particular embodiment, the expected sign appearance corresponding to the sign is based upon one or more previously captured images of the sign at one or more previous times.

In block 510, application 105 compares the images to the expected appearance to identify an anomaly in the sign such as a damaged or missing sign. In block 512, application 105 determines if an anomaly is identified in the sign. If no anomaly is detected, process 500 continues to 522. In block 514, application 105 flags the sign as anomalous. In block 516, application 105 determines whether the number of flags for a sign has reached a predetermined threshold value. If the threshold value has not been reached, process 500 continues to 522. If the threshold value has been reached, in block 518 application 105 identifies the sign as compromised. In block 520, application 105 notifies one or more subscribers that the sign is compromised.

In block 522, application 105 determines whether vehicle 120 is in an area including a compromised sign and/or a sign indicated as having an anomaly. In block 524, application 105 determines whether vehicle 120 is an SDV or other autonomous or semi-autonomous vehicle. If vehicle 120 is not an SDV, in block 526 application 105 sends a warning to vehicle 120 indicating that a compromised sign has been detected in the area and instructing the driver to take action to mitigate the effects of the compromised sign, and process 500 returns to block 502. If vehicle 120 is an SDV, in block 528 application 105 sends instructions to vehicle 120 instructing a vehicle control system of vehicle 120 to take an action or necessary precaution to mitigate effects of the compromised sign, such as changing a route, stopping, or changing speed, and process 500 returns to block 502. In various embodiments, application 105 continues to repeat process 500 when a vehicle having an imaging device that is registered with application 105 is within a vicinity of a registered sign.

Figure 6:
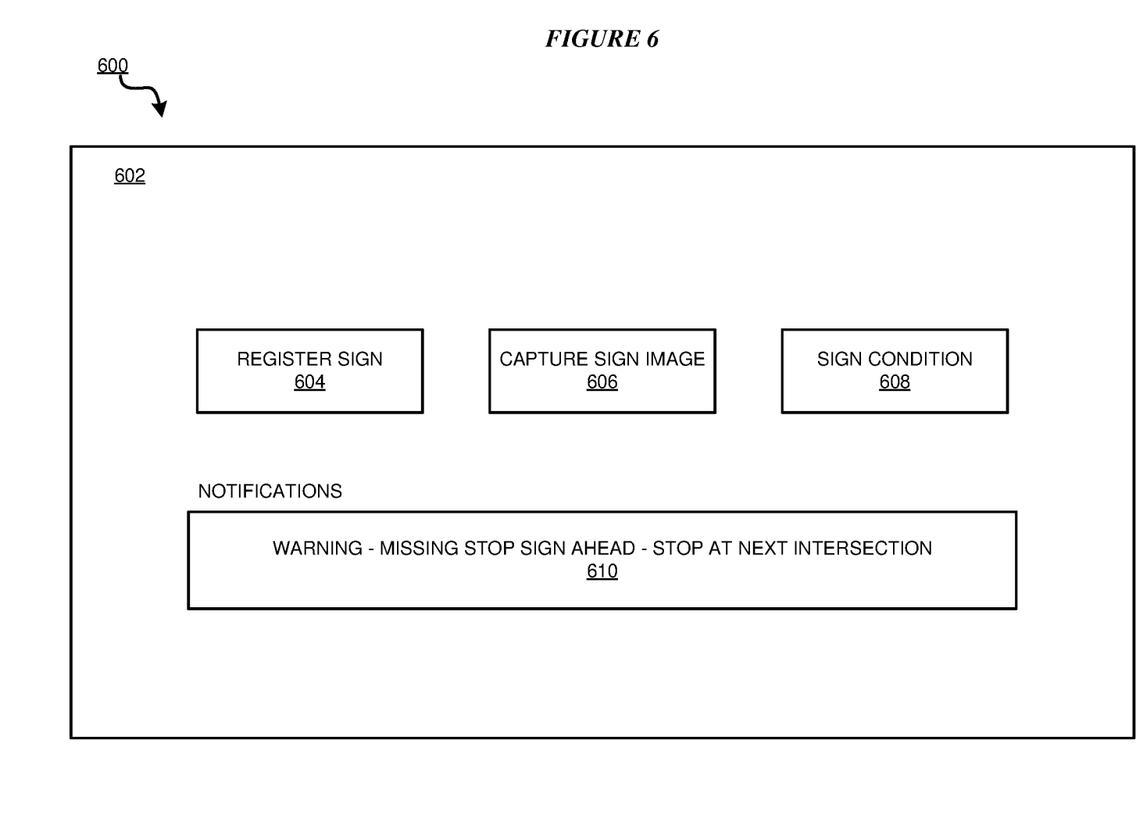
FIG. 6 depicts an example configuration of a user interface for automated crowd sourced tracking of signage conditions by vehicular imaging in accordance with an illustrative embodiment.

With reference to FIG. 6, this figure depicts an example configuration of a user interface 600 for automated crowd sourced tracking of signage conditions by vehicular imaging in accordance with an illustrative embodiment. User interface 600 includes a display screen 602 of a display device. In particular embodiments, display screen 602 may be included in GPS unit 128 and/or device 132. In the example configuration of FIG. 6, display screen 602 includes a "REGISTER SIGN" icon 604, a "CAPTURE SIGN IMAGE" icon 604, a "SIGN CONDITION" icon 608, and a notification area 610.

"REGISTER SIGN" icon 604 is configured to allow a user to initiate registration of sign information associated with a sign at or near a current location of a vehicle with application 105. "CAPTURE SIGN IMAGE" icon 604 is configured to allow a user to initiate capture of one or more images of a sign by one or more cameras integrated with the vehicle or another device, such as device 132, and send the one or more images to application 105. "SIGN CONDITION" icon 608 is configured to allow a user to indicate one or more conditions of the sign such as faded, missing, or vandalized, and send the indicated condition to application 105.

Notification area 610 is configured to display one or more notifications associated with a signage condition in an area associated with a current or expected location of the vehicle to the user. In particular embodiments, a notifications may include a warning or advisory indicating one or more of an identity of a sign, a current condition of the sign, and a recommended action to take to mitigate effects of the condition of the sign. In the example of FIG. 6, notification area 610 includes a warning of "WARNING—MISSING STOP SIGN AHEAD—STOP AT NEXT INTERSECTION"

Thus, a computer implemented method, system or apparatus, and computer program product are provided in the illustrative embodiments for automated crowd sourced tracking of signage conditions by vehicular imaging and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for tracking of signage conditions by vehicular imaging, comprising:
    receiving a registration request from a subscriber via a user interface, the registration request including input indicative of the subscriber wishing to track changes to a condition of a particular sign, a fixed location of the particular sign, and a feedback path for notifying the subscriber about changes to the condition of the particular sign;
    receiving image data including at least one image of signage captured at a predetermined location, the signage including the particular sign;
    receiving an expected appearance of the signage including an expected appearance of the particular sign, the expected appearance of the signage being based upon a plurality of images captured at the predetermined location;
    comparing the at least one image to an expected appearance of the signage to identify an anomaly in the signage including an anomaly in the particular sign;
    generating a list that includes an indication that the subscriber wishes to be notified of changes to the particular sign; and
    sending a notification to the subscriber based upon the identified anomaly in the particular sign.

2. The computer-implemented method of claim 1, wherein the expected appearance is based upon a plurality of images of the signage captured by different sources at the predetermined location.

3. The computer-implemented method of claim 1, further comprising:
    flagging the signage as anomalous.

4. The computer-implemented method of claim 3, further comprising:

determining that a number of flags of the signage has reached a threshold value, wherein the sending of the notification is responsive to the number of flags reaching the threshold.

5. The computer-implemented method of claim 3, further comprising:
   determining that the signage is a compromised sign based upon a number of flags of the signage reaching a threshold value; and
   updating a database of signage with the compromised sign.

6. The computer-implemented method of claim 5, further comprising:
   determining that a vehicle is within an area of the compromised sign; and
   sending a warning to the vehicle indicating that a compromised sign has been detected in the area.

7. The computer-implemented method of claim 6, wherein the warning further instructs a driver of the vehicle to take an action.

8. The computer-implemented method of claim 5, further comprising:
   determining that a vehicle is within an area of the compromised sign; and
   sending an instruction to the vehicle instructing a vehicle control system of the vehicle to take an action.

9. The computer-implemented method of claim 1, further comprising:
   receiving at least one condition of the predetermined location at a time of capture of the at least one image.

10. The computer-implemented method of claim 9, wherein the identifying of the anomaly in the signage is based upon the at least one condition.

11. A computer usable program product comprising one or more computer-readable storage devices, and program instructions stored on at least one of the one or more storage devices, the stored program instructions comprising:
    program instructions to receive a registration request from a subscriber via a user interface, the registration request including input indicative of the subscriber wishing to track changes to a condition of a particular sign, a fixed location of the particular sign, and a feedback path for notifying the subscriber about changes to the condition of the particular sign;
    program instructions to receive image data including at least one image of signage captured at a predetermined location, the signage including the particular sign;
    program instructions to receive an expected appearance of the signage including an expected appearance of the particular sign, the expected appearance of the signage being based upon a plurality of images captured at the predetermined location;
    program instructions to compare the at least one image to an expected appearance of the signage to identify an anomaly in the signage including an anomaly in the particular sign;
    program instructions to generate a list that includes an indication that the subscriber wishes to be notified of changes to the particular sign; and
    program instructions to receive send a notification to the subscriber based upon the identified anomaly in the particular sign.

12. The computer usable program product of claim 11, wherein the expected appearance is based upon a plurality of images of the signage captured by different sources at the predetermined location.

13. The computer usable program product of claim 11, further comprising:
    program instructions to flag the signage as anomalous.

14. The computer usable program product of claim 13, further comprising:
    program instructions to determine that a number of flags of the signage has reached a threshold value, wherein the sending of the notification is responsive to the number of flags reaching the threshold.

15. The computer usable program product of claim 13, further comprising:
    program instructions to determine that the signage is a compromised sign based upon a number of flags of the signage reaching a threshold value; and
    program instructions to update a database of signage with the compromised sign.

16. The computer usable program product of claim 15, further comprising:
    program instructions to determine that a vehicle is within an area of the compromised sign; and
    program instructions to send a warning to the vehicle indicating that a compromised sign has been detected in the area.

17. The computer usable program product of claim 16, wherein the warning further instructs a driver of the vehicle to take an action.

18. The computer usable program product of claim 15, further comprising:
    program instructions to determine that a vehicle is within an area of the compromised sign; and
    program instructions to send an instruction to the vehicle instructing a vehicle control system of the vehicle to take an action.

19. The computer usable program product of claim 11, further comprising:
    program instructions to receive at least one condition of the predetermined location at a time of capture of the at least one image.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
    program instructions to receive a registration request from a subscriber via a user interface, the registration request including input indicative of the subscriber wishing to track changes to a condition of a particular sign, a fixed location of the particular sign, and a feedback path for notifying the subscriber about changes to the condition of the particular sign;
    program instructions to receive image data including at least one image of signage captured at a predetermined location, the signage including the particular sign;
    program instructions to receive an expected appearance of the signage including an expected appearance of the particular sign, the expected appearance of the signage being based upon a plurality of images captured at the predetermined location;
    program instructions to compare the at least one image to an expected appearance of the signage to identify an anomaly in the signage including an anomaly in the particular sign;
    program instructions to generate a list that includes an indication that the subscriber wishes to be notified of changes to the particular sign; and program instructions to receive send a notification to the subscriber based upon the identified anomaly in the particular sign.

\* \* \* \* \*